United States Patent [19]

Ono

[11] Patent Number: 5,146,239

[45] Date of Patent: Sep. 8, 1992

[54] TAG PRINTER

[75] Inventor: Yoshiaki Ono, Shizuoka, Japan

[73] Assignee: Tokyo Electric Co., Ltd., Tokyo, Japan

[21] Appl. No.: 619,998

[22] Filed: Nov. 30, 1990

[30] Foreign Application Priority Data

Dec. 8, 1989 [JP] Japan .................................. 1-319811
Oct. 19, 1990 [JP] Japan .................................. 2-282325

[51] Int. Cl.$^5$ ............................................ G01D 15/10
[52] U.S. Cl. ................................ 346/76 PH; 346/94; 346/97
[58] Field of Search .............. 346/76 PH, 94, 97, 100; 283/80, 81

[56] References Cited

U.S. PATENT DOCUMENTS 4,240,862 12/1980 Ishiyama ................................ 346/97

FOREIGN PATENT DOCUMENTS 2158748 8/1971 Fed. Rep. of Germany .
3538987 5/1987 Fed. Rep. of Germany ........ 283/80
3620114 12/1987 Fed. Rep. of Germany .
2144239 2/1973 France .
2485770 12/1981 France .
WO8605303 9/1986 PCT Int'l Appl. .
1068891 5/1967 United Kingdom ................... 283/80
1159022 7/1969 United Kingdom .

OTHER PUBLICATIONS

Patent Abstracts of Japan, vol. 7, No. 145, Jun. 1983, Tokyo Shibaura Denki, Printing Apparatus.

Primary Examiner—Benjamin R. Fuller
Assistant Examiner—Huan Tran
Attorney, Agent, or Firm—Oblon, Spivak, McClelland, Maier & Neustadt

[57] ABSTRACT

The present invention uses heat-sensitive paper with an adhesive face and plural kinds of identification portions, arranged in the longitudinal direction, provided on the reverse thereof and has a feed portion setting up a relative motion between the heat-sensitive paper and a punch, which is driven by a drive portion for making a perforation in the heat-sensitive paper. It further has a drive timing changing means for changing timing of the drive of the drive portion during the relative motion according to the kind of the tag to be issued so that a perforation is made in a desired position of the heat-sensitive paper, whereby, when the tag after being issued is folded in two and its end portions are stuck together with adhesive, the identification portion looking out of the perforation is made to be the identification portion corresponding to the kind of the tag, and thus, the kind of the tag is made identifiable at a glance.

10 Claims, 5 Drawing Sheets

FIG. 6
FIG. 7
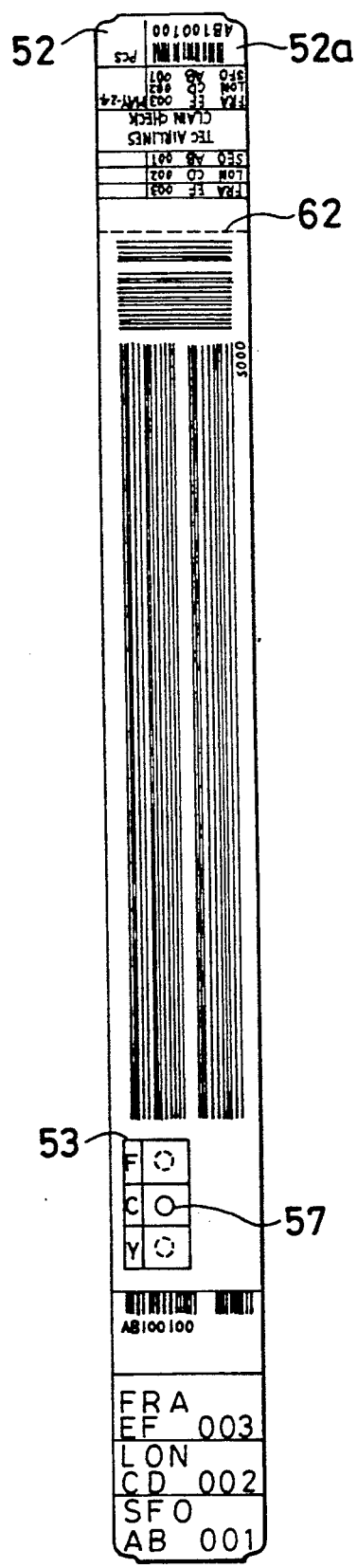
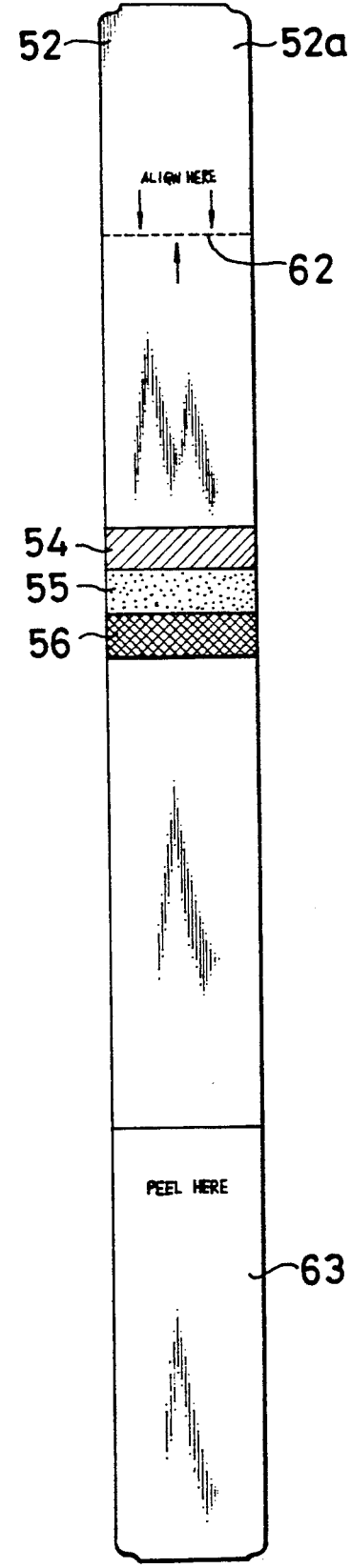

TAG PRINTER

FIELD OF THE INVENTION AND RELATED ART STATEMENT

The present invention relates to a thermal printer for making a print on heat-sensitive paper, and more particularly to a tag printer for printing and issuing a tag.

There has so far been in use what is called a tag printer, which holds heat-sensitive paper between its platen and thermal head and makes a predetermined print on the heat-sensitive paper and issues the printed paper as a tag.

At an airport baggage checking counter, a tag showing the destination and flight number is being affixed to a checked baggage. In order to perform such operations quickly and reliably, it is required that the kind of a tag can be identified at a glance, without reading details therein. To meet that requirement, such a system has so far been practiced to prepare tags in different colors according to their kinds. For example, at least a portion of the print on the tag is printed in different colors so that these tags are classified into those indicating seats of different classes, such as the first class, the business class, and the economy class.

As a means for printing tags in different colors, there has so far been practiced a method in which special heat-sensitive coloring paper exhibiting different colors according to temperatures applied thereto is used and the temperature applied to the heat-sensitive coloring paper is varied by controlling the temperature of the thermal head, thereby obtaining desired colors on the heat-sensitive coloring paper.

Difficulties involved in such a conventional technology will be described below. The special heat-sensitive coloring paper exhibiting different colors according to applied temperatures thereto is susceptible to ambient temperature and lighting and liable to discolor affected by environmental conditions. Hence, the heat-sensitive coloring paper has a disadvantage that it is inconvenient to handle.

OBJECT AND SUMMARY OF THE INVENTION

A first object of the present invention is to provide a tag printer capable of preparing a tag, in which indication of the classification of the tag is made recognizable at a glance, in a reliable and stabilized manner.

A second object of the present invention is to provide a tag printer which is simple in structure and low in cost.

In order to attain the above mentioned objects, the present invention comprises heat-sensitive paper with an adhesive face and plural kinds of identification portions, arranged in the longitudinal direction, provided on the reverse thereof, a thermal printing portion for making a predetermined print on the obverse of the heat-sensitive paper while a relative motion is made between the same and the heat-sensitive paper, a punch driven by a drive portion for making a perforation in the heat-sensitive paper, a feed portion for setting up a relative motion between the punch and thermal printing portion and the heat-sensitive paper, and drive timing changing means for changing drive timing of the drive portion according to the kind of a tag to be issued. Thus, a relative motion is set up between the thermal printing portion and punch and the heat-sensitive paper by the feed portion, and during the course, the thermal printing portion prints data to be printed on the heat-sensitive paper and the punch makes a perforation in a predetermined position of the heat-sensitive paper. Then, if the issued tag is folded back and the portions of the adhesive face on the reverse are stuck together, a predetermined identification portion comes to look out of the perforation made in the tag. If the drive timing of the drive portion for driving the punch is changed in setting up the relative motion between the heat-sensitive paper and the punch, the position of the perforation made in the heat-sensitive paper is changed. Thus, by changing the position of the perforation made in the heat-sensitive paper, a desired one of the plural kinds of the identification portions arranged in the longitudinal direction of the heat-sensitive paper is allowed to look out of the perforation. The thus exposed identification portion indicates the kind of the tag.

Also, the present invention comprises heat-sensitive paper with an adhesive face and an identification portion on the reverse thereof and a thermal printing portion for making a predetermined print including a plurality of perforation designating boxes arranged in the longitudinal direction of the heat-sensitive paper on the observe of the heat-sensitive paper while a relative motion is made between the same and the heat-sensitive paper, or heat-sensitive paper with an adhesive face and an identification portion provided on the reverse thereof and a plurality of perforation designating boxes arranged in the longitudinal direction provided on the observe thereof and a thermal printing portion for making a predetermined print on the observe of the heat-sensitive paper while a relative motion is made between the same and the heat-sensitive paper. It further comprises a punch driven by a drive portion for making a perforation in the heat-sensitive paper, a feed portion for setting up a relative motion between the punch and thermal printing portion and the heat-sensitive paper, and drive timing changing means for changing drive timing of the drive portion according to the kind of a tag to be issued so that the position of the perforation made in the perforation designating boxes is changed. Thus, because the drive timing of the drive position is changed by the drive timing changing means, a perforation is made by the punch in a desired position of the perforation designating boxes of the heat-sensitive paper. Then, if the issued tag is folded back and allowed to stick together, the identification portion looks out of the perforation made in the tag and, thus, the identification portion is shown in a specific one of the perforation designating boxes so that the kind of the tag can be identified at a glance.

According to the present invention as described above, it is made possible, while using monochromatic heat-sensitive paper easy to handle, to identify the kind of the tag at a glance. Further, the reliability on and stability in the classified indication of the kind of the tag is maintained and simplification and cost reduction of the apparatus can be attained.

BRIEF DESCRIPTION OF THE DRAWINGS

FIG. 6 is a plan view showing the observe of a tag;

FIG. 7 is a plan view showing the reverse of the tag; and

DESCRIPTION OF THE PREFERRED EMBODIMENTS

Figure 2:
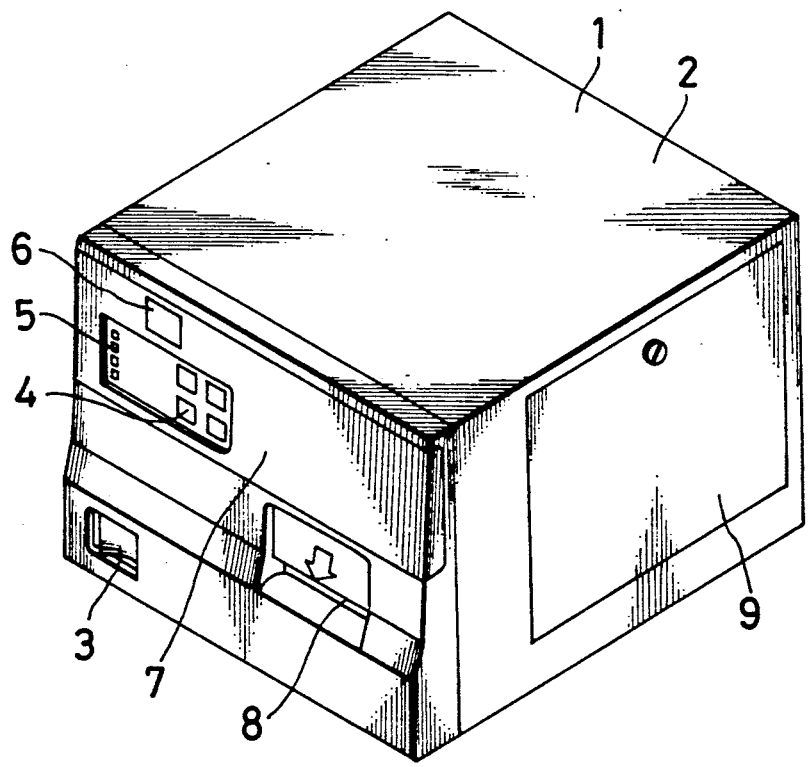
FIG. 2 is a perspective view showing an external appearance of the tag printer.

An embodiment of the present invention will be described below with reference to the accompanying drawings. FIG. 2 is a perspective view showing an external appearance of a tag printer 1. On the front face of the housing 2 of the tag printer 1, there are provided a power switch 3, an operator panel 7 with various keys 4, LEDs 5 showing service conditions, and an indicator 6 disposed thereon, and a tag outlet 8. On one side face, there is provided a door 9 for opening and shutting to supply the later described heat-sensitive paper therethrough.

Figure 1:
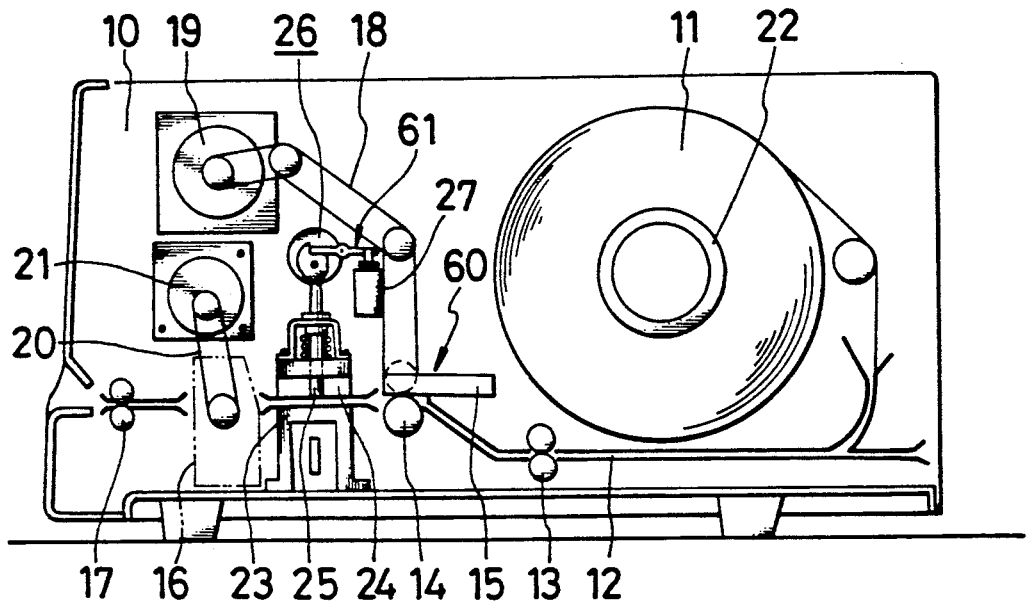
FIG. 1 is a side view showing the interior of a tag printer.

Internal structure of the tag printer is shown in FIG. 1. Referring to the figure, reference numeral 10 denotes a frame, and on this frame 10, there is provided a transport path 12 for guiding the heat-sensitive paper 11, which is made in large length and formed in a roll. Along this transport path 12, a paper feed roller 13 as a delivery portion, a platen 14, a thermal head 15 to be pressed on the platen 14, a cutter mechanism 16, and a paper discharge roller 17 are sequentially arranged. The platen 14 and the thermal head 15 constitute a thermal printing portion 60. A step motor 19 for driving the platen 14 and the paper feed roller 13 through a transmission mechanism 18 and a motor 21 for driving the rotary cutter of the cutter mechanism 16 through a transmission mechanism 20 are held on the frame 10. The paper discharge roller 17 is coupled with a motor, not shown. The heat-sensitive paper 11 is supported by a shaft 22 erected on the side wall of the frame 10.

Between the platen 14 and the cutter mechanism 16, there is provided a stool 23 for supporting the under side of the transport path 12, and on an extended part 24 upwardly extended from one side of the stool 23, there is held a punch 25 urged upward for vertical movement. Reference numeral 26 denotes a drive portion for driving the punch 25, and 27 denotes a solenoid as connecting/disconnecting means for determining the drive timing of the drive portion 26. The solenoid 27 is electrically connected with a control portion, not shown, and the control portion is electrically connected with a sensor, not shown, for detecting the position of the heat-sensitive paper 11. The solenoid 27, the control portion, and the sensor constitute a drive timing changing means 61.

Figure 3:
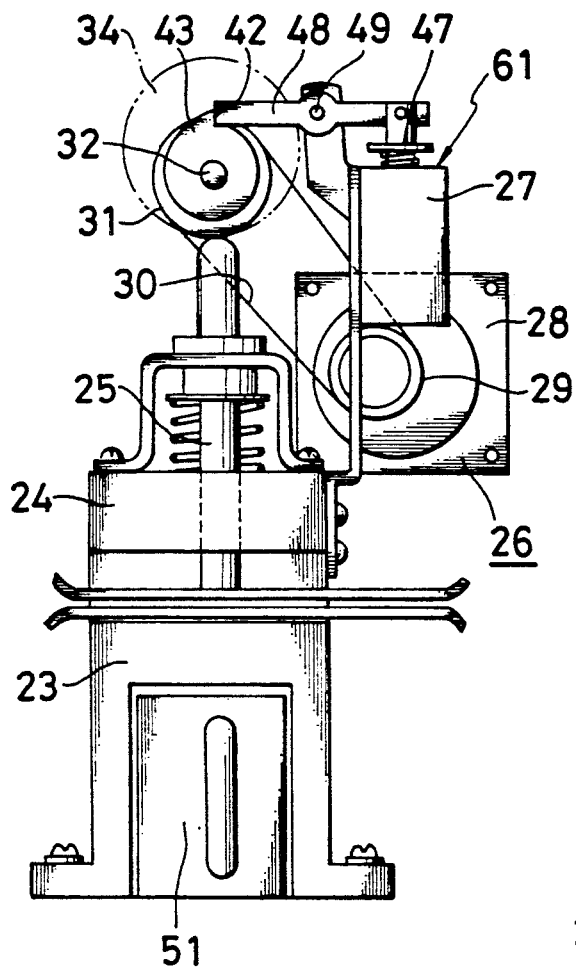
FIG. 3 is a side view showing a punch and a drive portion coupled together.
Figure 4:
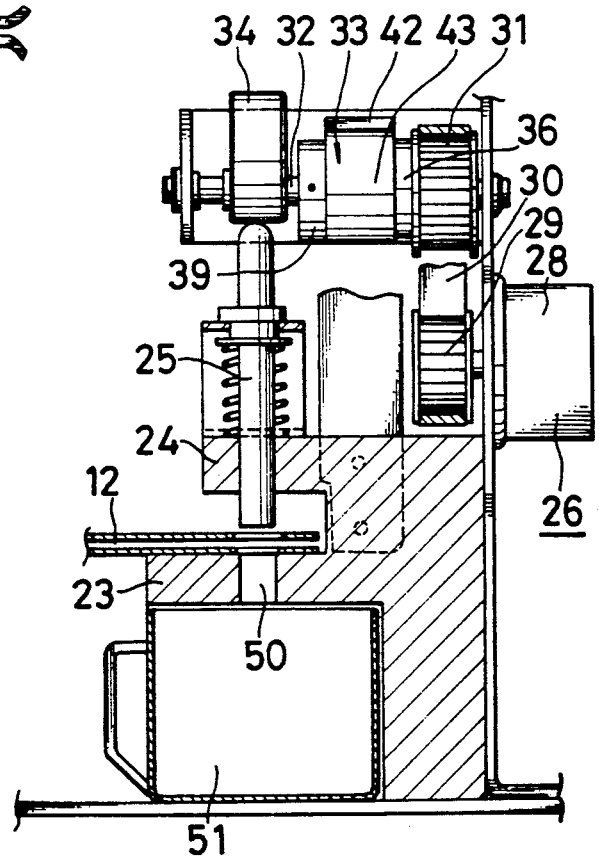
FIG. 4 is an enlarged longitudinal sectional front view showing the punch and the drive portion coupled together.

Structure of the drive portion 26 is shown in FIG. 3 and FIG. 4. The drive portion 26 is constituted of a pulley 29 directly connected with a motor 28, a pulley 31 receiving the rotation of the pulley 29 through a belt 30, a spring clutch 33 as a clutch mounted on a shaft 32 coaxial with the pulley 31, and an eccentric cam 34 connected with the output side of the spring clutch 33 and abutting on the top end of the punch 25.

Figure 5:
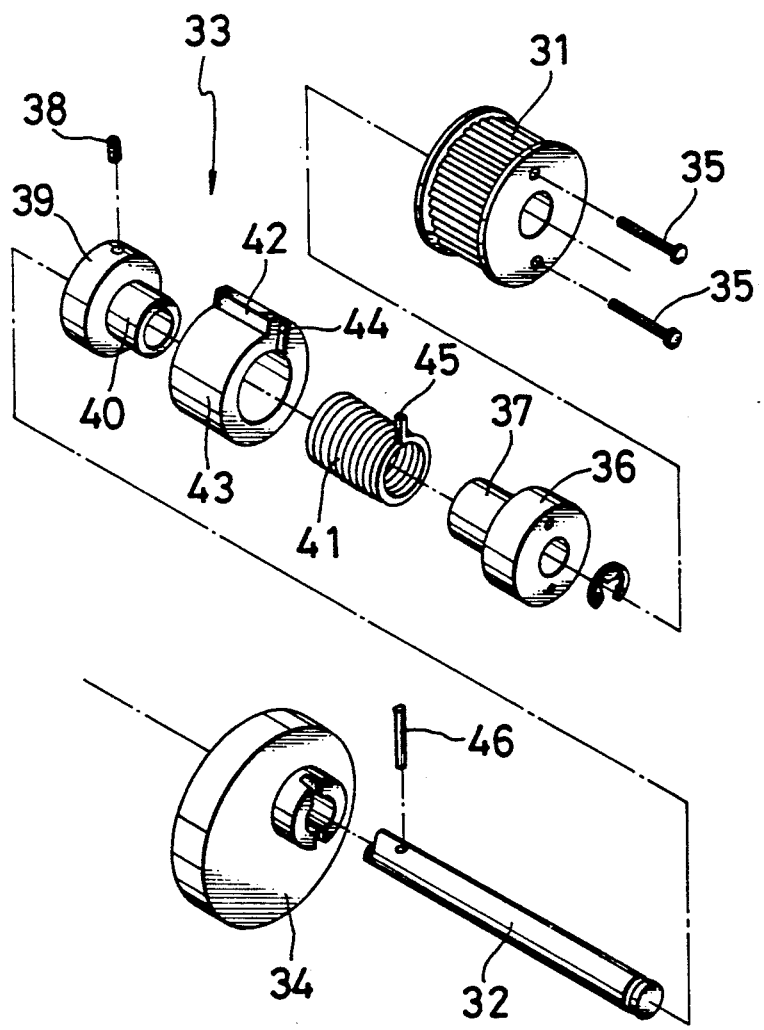
FIG. 5 is an exploded perspective view of a spring clutch.

The spring clutch 33, as shown in FIG. 5, is constructed by coaxially connecting the pulley 31 and a bush 36, both being rotatably fitted on the shaft 32, with screws 35, tightly winding a spring 41 around a cylindrical part 37 of the bush 36 and a cylindrical part 40 of a bush 39, which is fixedly fitted on the shaft 32 with a screw 38, fitting a sleeve 43, which has a projected part 42 in one position on the periphery thereof, on the periphery of the spring 41, and having a hook 45 of the spring 41 engaged with a groove 44 made in the sleeve 43. The eccentric cam 34 is prevented from rotating by a spring pin 46 inserted in the shaft 32.

As shown in FIG. 3, the solenoid 27 has a plunger 47 urged toward its reset position (upward), and there is provided a trigger plate 48, of which the rear end is rotatably connected with the plunger 47 and the front end is engaged with the projected part 42 of the sleeve 43, supported by a shaft 49 for rotation around it.

Further, in the stool 23, there is made a hole 50, as shown in FIG. 4, allowing the lower end of the punch 25 to slidably fit therein, and below the hole 50, there is drawably provided a wastebasket 51 with its top side open.

FIG. 6 is a plan view showing the obverse of an issued tag 52 and FIG. 7 is a plan view showing the reverse of the tag 52. This tag 52 is issued by printing prescribed data on the heat-sensitive paper 11 with the thermal head 15 and then cutting the paper to a fixed length with the cutter mechanism 16. In such tag 52, there is formed a baggage check 52a at its end, the baggage check 52a being separable from the body of the tag 52 along a perforated line 62 as a reference line. Further, on the obverse of the heat-sensitive paper 11, there are provided in advance perforation designating boxes 53 designating the position in which a perforation is to be made according to the class of seat, namely, box F for first class, box C for business class, and box Y for economy class. A portion of the reverse the heat-sensitive paper 11 is arranged to be an adhesive face, not shown, and a seal 63 is put on the adhesive face. At the portion other than the adhesive face on the reverse of the heat-sensitive paper 11, there are provided in advance a plurality of identification portions 54, 55, and 56. These identification portions 54, 55, and 56 are shown in different colors, different patterns, or the like so that the kind of the tag 52 may be identified at a glance. For example, the identification portion 54 is printed green, the identification portion 55 is printed blue, and the identification portion 56 is printed red. In this case, these identification portions are positioned such that, when the tag 52 is folded with one end aligned with the perforated line 62 as the reference line, the back side of the box F of the perforation designating boxes 53 coincides with the identification portion 56, the backside of the box C coincides with the identification portion 55, and the backside of the box Y coincides with the identification portion 54.

With the described arrangement, in the state where the trigger lever 48 is in engagement with the projected part 42 of the sleeve 43 and the spring clutch 33 is held in its state not transmitting power, the rotation of the motor 28 is transmitted only to the pulley 31 and the bush 36 on one side, not beyond. In this state, such data as the destination and flight number are printed on the paper by the thermal head 15 while the heat-sensitive paper 11 is fed by the paper feed roller 13. If, then, the class of seat is input, the solenoid 27 is driven at predetermined timing corresponding to the selected class, whereby the trigger lever 48 is disengaged from the projected part 42 of the sleeve 43 and the spring 41, being so far prevented from rotating with its hook 45 engaged with the groove 44 of the sleeve 43, is allowed to rotate together with the sleeve 43 by means of its friction with the bush 36. At this time, the portion of the spring 41 abutting on the bush 39 is kept stopped on account of resistance exerted on the side of the bush 39, so that the spring 41 reduces its coil diameter. As a result of reduction in the coil diameter of the spring 41, the spring 41 becomes wound tighter around the cylindrical parts 37 and 40 of the two bushes 36 and 39, thereby causing the bush 39 on the driven side to rotate together with the shaft 32 and the eccentric cam 34. Then, since the power supply to the solenoid 27 is cut off before the sleeve 43 completes one rotation, the trigger plate 48 is reset and put into engagement with the projected part 42 of the sleeve 43 so that the spring clutch 33 is brought into its state not transmitting power. By the rotation of the eccentric cam 34 during this period, the punch 25 is caused to make one vertical reciprocating motion thereby making a perforation 57 in one of the perforation designating boxes 53 of the heat-sensitive paper 11. In succession, the cutter mechanism 16 functions to cut the heaat-sensitive paper 11. Thus, a tag 52 is issued.

Figure 8:
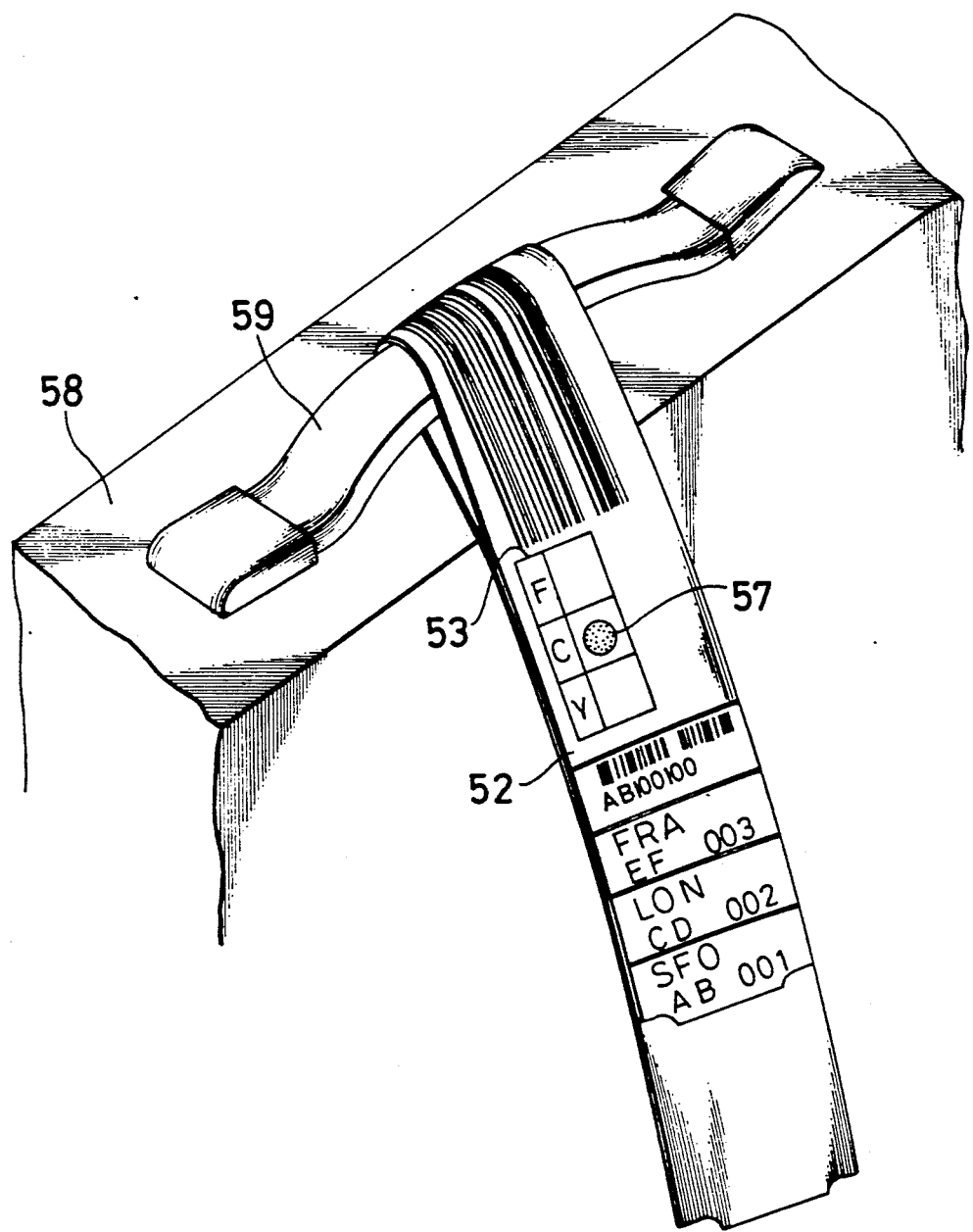
FIG. 8 is a perspective view partially showing a baggage with a tag affixed thereto.

Then, the seal 63 is peeled off the issued tag 52 so that the adhesive face is exposed. Thereupon, the tag is passed behind the handle 59 of the baggage 58 while it is folded into a loop and both ends are put together at the adhesive face with one edge of the tag aligned with the perforated line 62. Thereby, the identification portion 55 is allowed to look out of the perforation 57 made earlier. Such a state is shown in FIG. 8. In sticking the two portions of the tag 52 together, the alignment is easily done by bringing one edge of the tag just on the perforated line 62. At this time, if the perforation 57 is made in the position Y of the perforation designating boxes 53, the identification portion 54 looks out of the perforation 57, and if the perforation 57 is made in the position F, the identification portion 56 looks out of the perforation 57. To change the perforated position in the perforation designating boxes 53 as above, the drive timing of the punch 25 is changed by the drive timing change means 61. More specifically, during the course of the feed of the heat-sensitive paper 11 by the paper feed roller 13, the time from the point at which a detected signal of a sensor detecting a position of the heat-sensitive paper 11 is output to the point at which the solenoid 27 is driven is set for the drive circuit. Finally, the baggage check 52a is cut off the body of the tag 52 on the perforated line 62.

As described in the foregoing, various data can be printed by the thermal head 15 and identification of the kind of the tag 52 can be achieved according to the correspondence between the perforation 57 made in the tag 52 and the identification portion 54, 55, or 56. Thus, the need for use of special heat-sensitive coloring paper, which is not easy to handle and difficult to obtain a desired color therefrom, can be eliminated, but monochromatic heat-sensitive paper 11 easy to handle can be used. Hence, the reliability on and stability in the indication of the kind of the tag 52 can be enhanced and good baggage checking operations can be achieved. In addition, since the thermal printing portion 60 is not required to apply variable temperatures to the heat-sensitive paper 11, electric control of the thermal printing portion 60 becomes easier and thereby the apparatus is made simpler in structure and lower in cost.

In actual practice, the perforation designating boxes 53 may be omitted, and when the perforation designating boxes 53 are not omitted, the identification portions 54, 55, nad 56 may be put into one kind of identification portion. The perforation designating boxes 53 may be printed by the thermal printing portion 60. The motor 28 and the eccentric cam 34 may be coupled through a drive portion not including a clutch, and a circuit changing the timing for the motor 28 to be driven according to the kind of the tag 52 may be used as the drive timing changing means. The heat-sensitive paper 11 may be fixed in position and the mechanisms for the thermal printing portion 60, the punch 25, and the like may be arranged to move. Further, a cut-sheet may be used for the heat-sensitive paper 11 thereby omitting the cutter mechanism 16.

What is claimed is :

1. A tag printer for producing a tag from heat-sensitive paper, comprising:

heat-sensitive paper having obverse and reverse sides, said paper being advanced in a longitudinal direction and having an adhesive face and plural kinds of identification portions arranged in the longitudinal direction on the reverse side thereof;

a thermal printing for making a predetermined print on the observe side of said heat-sensitive paper while a relative motion is made between the thermal printing portion and said heat-sensitive paper;

a punch driven by a drive portion for making a perforation in said heat-sensitive paper;

a feed portion for setting up a relative motion between said punch and said thermal printing portion and said heat-sensitive paper; and drive timing changing means for changing drive timing of said drive portion so that a position of said perforation can be changed in order to produce tags displaying one of a variety of different designations.

2. A tag printer according to claim 1, wherein some portions provided on said tag are disposed in such relative positions that the perforation made in a specific position comes to coincide with a corresponding identification portion when one end of the tag is aligned with the other end and the end portions of said tag are stuck together with adhesive.

3. A tag printer according to claim 1, wherein some portions provided on said tag are disposed in such relative positions that the perforation made in a specific position comes to coincide with a corresponding identification portion when one end of the tag is aligned with a reference line provided on the reverse side of said heat-sensitive paper and the end portions of said tag are stuck together with adhesive.

4. A tag printer according to claim 1, wherein said identification portions are shown in different colors.

5. A tag printer according to claim 1, wherein said feed portion is arranged such that said heat-sensitive paper travels along a predetermined transport path.

6. A tag printer according to claim 5, wherein heat-sensitive paper made in large length and formed in a roll is used and it is adapted such that a print is made on said heat-sensitive paper and a perforation is made therein and then it is cut by a cutter before being issued as a tag.

7. A tag printer according to claim 1, wherein said drive portion and said punch are coupled through a clutch and said drive timing changing means is constituted of means for bringing said clutch into connecting and disconnecting states.

8. A tag printer according to claim 1, wherein said drive portion and said punch are directly connected and said drive timing changing means is constituted of a control circuit for controlling said drive portion.

9. A tag printer for producing a tag from heat-sensitive paper, comprising:

heat-sensitive paper having obverse and reverse sides, said paper being advanced in a longitudinal direction and having an adhesive face and an identification portion provided on the reverse side thereof;

a thermal printing portion for making a predetermined print including a plurality of perforation designating boxes arranged in the longitudinal direction of said heat-sensitive paper on the obverse side of said heat-sensitive paper while a relative motion is made between the thermal printing portion and said heat-sensitive paper;

a punch driven by a drive portion for making a perforation in said heat-sensitive paper;

a feed portion for setting up a relative motion between said punch and thermal printing portion and said heat-sensitive paper; and drive timing changing means for changing drive timing of said drive portion so that said perforation can be selectively located in any one of said perforation designating boxes.

10. a tag printer for producing a tag from heat-sensitive paper, comprising:

heat-sensitive paper having obverse and reverse sides, said paper being advanced in a longitudinal direction and having an adhesive face and an identification portion provided on the reverse side thereof and a plurality of perforation designating boxes arranged in the longitudinal direction provided on the obverse side thereof;

a thermal printing portion for making a predetermined print on the obverse side of said heat-sensitive paper while a relative motion is made between the thermal printing portion and said heat-sensitive paper;

a punch driven by a drive portion for making a perforation in said heat-sensitive paper;

a feed portion for setting up a relative motion between said punch and thermal printing portion and said heat sensitive paper; and drive timing changing means for changing drive timing of said drive portion so that said perforation can be selectively located in any one of said perforation designating boxes.

* * * * *